(12) United States Patent
Wozniak

(10) Patent No.: US 6,278,925 B1
(45) Date of Patent: Aug. 21, 2001

(54) ADAPTIVE METHOD FOR DETERMINING ONSET OF POSITIVE TORQUE IN A POWERTRAIN HAVING AN AUTOMATIC TRANSMISSION

(75) Inventor: Kenneth Paul Wozniak, Chelsea, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/551,427

(22) Filed: Apr. 18, 2000

(51) Int. Cl.[7] .............................. B60K 41/22; G01L 3/00
(52) U.S. Cl. ............................ 701/54; 701/58; 701/64; 477/120
(58) Field of Search .................................. 701/51, 54, 58, 701/60, 61, 64, 67, 68, 101; 477/120, 115, 148, 111, 86

(56) References Cited

U.S. PATENT DOCUMENTS

| | | | |
|---|---|---|---|
| 4,535,412 | * 8/1985 | Cederquist | 702/41 |
| 5,046,383 | * 9/1991 | Butts et al. | 477/120 |
| 5,241,855 | 9/1993 | Cullen et al. | 73/117.3 |
| 5,477,950 | 12/1995 | Maloof | 192/3.29 |

* cited by examiner

Primary Examiner—Tan Nguyen
(74) Attorney, Agent, or Firm—Frank G. McKenzie

(57) ABSTRACT

A method for determining the onset of positive torque through an automatic transmission (the power-on point), includes saving engine torque magnitudes within a specified tolerance of each other and within a adaptive limits, the highest torque value of the sampled torque magnitudes being stored in memory. The saved value plus a calibrated safety margin is used to compare to the calculated transmission input torque. If the input torque is higher, the powertrain is considered "power-on." In addition to the safety margin, other calibratable adder torque values can be used to compensate for air conditioning, electrical loads, temperature, etc. If the samples fall below the lower adaptive limit, the lower limit is used plus any torque adders. If the adaptive samples are above the adaptive limit, the upper adaptive limit is used without any torque adders. A calibrated baseline torque value is used for power-on determination until enough valid samples are obtained.

13 Claims, 4 Drawing Sheets

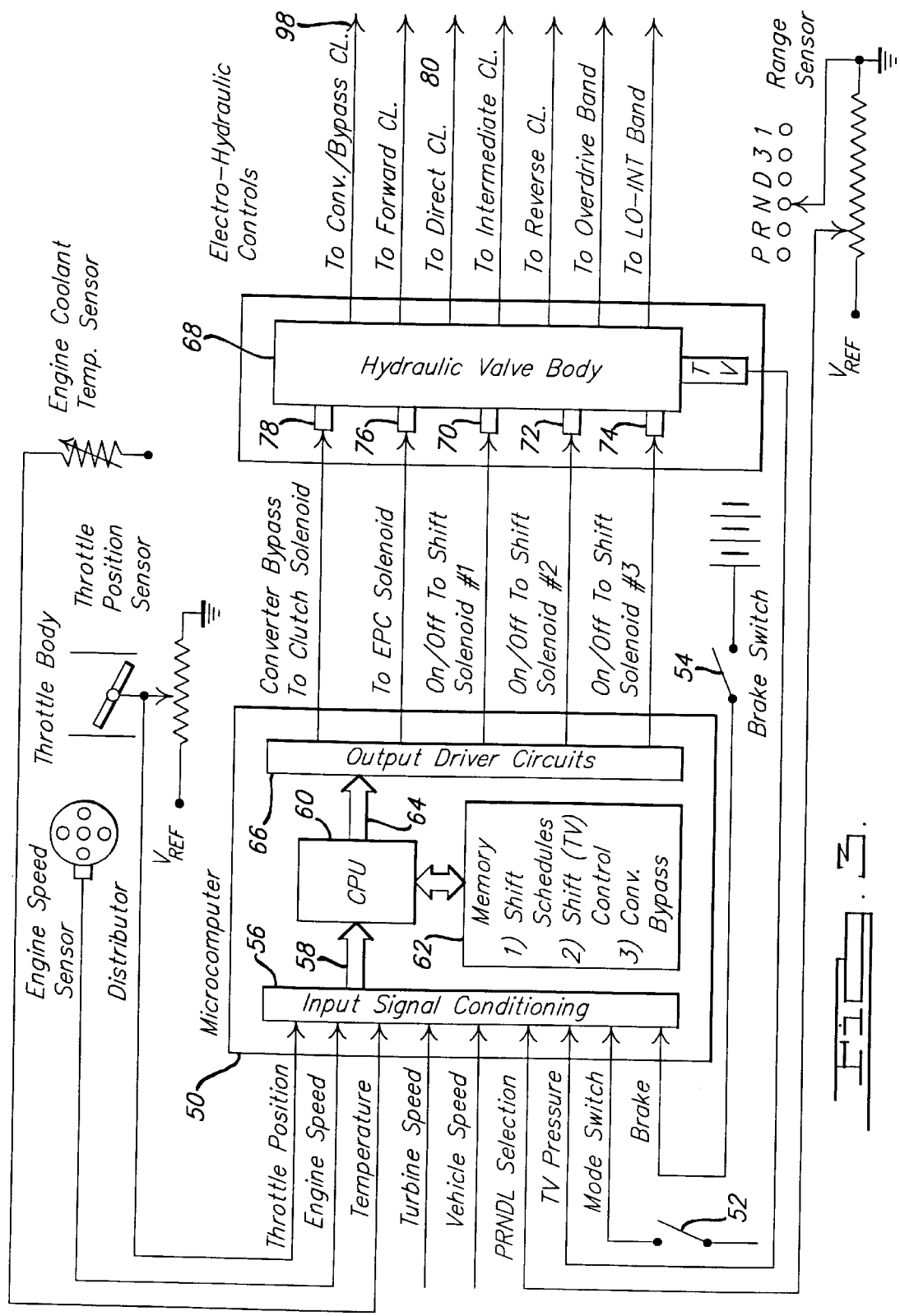

ADAPTIVE METHOD FOR DETERMINING ONSET OF POSITIVE TORQUE IN A POWERTRAIN HAVING AN AUTOMATIC TRANSMISSION

BACKGROUND OF THE INVENTION

1. Field of the Invention

This invention relates control of a powertrain in an motor vehicle. More particularly it pertains to determining incipient positive torque in a powertrain, i.e., the threshold of a power-on condition.

2. Description of the Prior Art

The powertrain of a motor vehicle is tested according to a procedure defined by the federal government for compliance with governmental standards including conformance with onboard diagnostic capability (the OBD II test standard) and for other system diagnostics purposes. During execution of the federal test procedure, it is necessary to determine the torque produced by the engine of the powertrain. Conventionally, this torque magnitude is determined from a calibratable scalar value inferred by mapping engine torque magnitudes conforming to a range of engine parameters including throttle position, engine speed, MAP, temperature, etc. Preferably the engine torque determined in this way should be sufficiently high in order for the OBD II test to be conducted. However, variations in the vehicle weight, the gear ratio of the axle and performance variations associated with the service life of the powertrain affect the power-on threshold point, and in that way influence whether the calibrated scalar torque estimate is sufficiently high to permit federal testing to occur.

It is preferable to know precisely the threshold of the power-on condition rather than to arbitrarily estimate or guess a conservatively high torque magnitude. For example, when a fairly highly conservative torque magnitude is assumed for the threshold of the power-on condition, a large portion of the operating range of the federal test procedure can fail to run.

It is preferable that a control of a powertrain be capable of determining precisely the onset of a power-on condition, and that the control adapt to variations in vehicle gross weight, axle ratio, and the effects of service life and other vehicle-to-vehicle variations that influence the threshold of the power-on condition.

The federal test procedure requires that the onboard diagnostic system demonstrate its ability to detect a failure and to produce an accurate indication thereof to a vehicle operator. If the diagnostic system fails to detect and indicate the failure, the vehicle is determined to be non-compliant with a federal onboard diagnostic standard.

Typically the calculation of inferred torque into and out of the automatic transmission is not accurate at low torque levels due to vehicle variations and mapping inaccuracies. Since many of the functional tests used for OBDII diagnostics require a power-on indication to run, proper power-on indication is crucial, especially when running the federal test procedure drive cycle for OBDII compliance, which tends to run at a fairly low torque level.

SUMMARY OF THE INVENTION

It is an object of this invention to provide a torque-based method for determining the threshold of positive torque flow through an automatic transmission. The method adapts to the particular powertrain characteristics and compensates for vehicle-to-vehicle variations and changes in the powertrain of a motor vehicle during its service life. As a result, this invention provides a better power-on indication than conventional techniques. It is another object to provide an accurate, consistent power-on indication during the performance of functional and OBDII diagnostic tests.

In realizing these objects, the method of this application for determining, with the aid of an electronic computer system, the power-on torque magnitude in a powertrain of a motor vehicle having an engine, and an automatic transmission having a torque converter that includes a bypass clutch for mechanically connecting and disconnecting the impeller and turbine of the torque converter, the impeller connected to the engine, the turbine connected to a transmission input shaft, includes the steps of repetitively determining that the torque converter clutch is disengaged; repetitively determining that the speed ratio across the torque converter is within a predetermined speed range; repetitively determining that the rate of vehicle deceleration is lower than a predetermined deceleration rate; repetitively determining the magnitude of torque produced by the engine; repetitively storing successive engine torque magnitudes in retrievable electronic memory; deleting from memory the stored torque magnitudes, if any of the stored torque magnitudes is greater than a predetermined magnitude from the other stored torque magnitudes; setting the power-on torque magnitude equal to the maximum stored torque magnitude, if all stored torque magnitudes are within a predetermined range of torque magnitudes; adding to the maximum stored torque magnitude the corresponding magnitude of engine torque currently driving accessory equipment; and using the sum of the torque magnitudes as the power-on torque magnitude.

BRIEF DESCRIPTION OF THE DRAWINGS

FIG. 3 is a block diagram showing a microprocessor in a control system for an automatic transmission that includes multiple speed ratio gearing and a hydrokinetic torque converter having a lockup clutch.

DESCRIPTION OF THE PREFERRED EMBODIMENT

Figure 1:
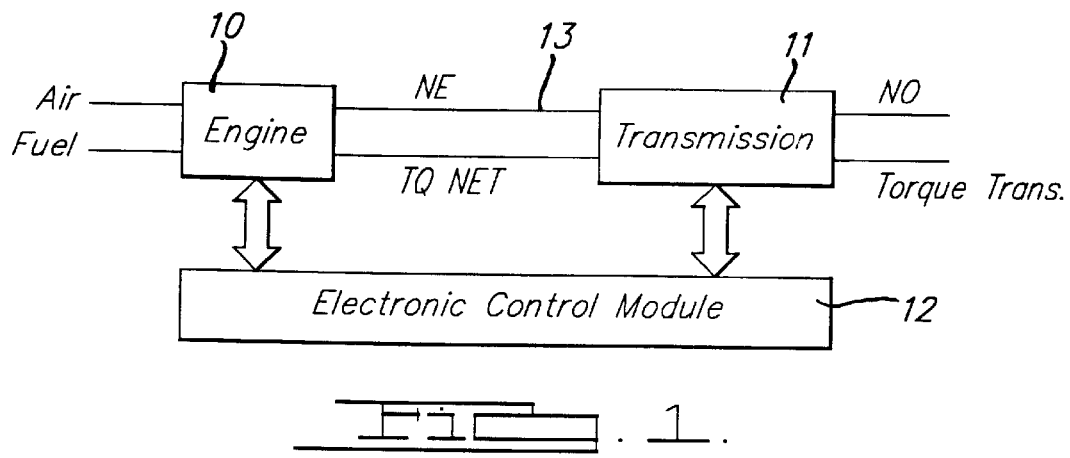
FIG. 1 is a schematic block diagram of a powertrain that includes an engine and transmission and an electronic control for controlling the powertrain.

Referring to FIGS. 1 and 3, air and fuel are inducted by an internal combustion engine 10, which drives a shaft connecting the engine output and transmission 11 input. That shaft rotates at the speed of the engine and carries the magnitude of torque produced by the engine minus torque that drives vehicle accessories such as an air conditioning compressor, or power steering pump, electrical power production loads, etc. Both the engine 10 and transmission 11 are coupled to an electronic engine control module 12, which includes a microprocessor 50, input conditioning circuit 56, an electronic memory 62 containing various control algorithms for processing spark timing input, exhaust gas recirculation rate input, percent methanol fuel input, air/fuel ratio input, engine RPM input, engine air charge input, engine coolant temperature, firing cylinder indication input, engine operating hours, power steering pressure, timer input, air conditioning head pressure or air change temperature input, and a flag indicating whether the air conditioning compressor is on or off. These engine operating parameters and other such parameters are described in U.S. Pat. No. 5,241,855, which is owned by the assignee of the present invention. A method for determining engine torque is described in U.S. Pat. No. 5,241,855, the entire disclosure of which is incorporated herein by reference.

The microprocessor 50 shown in FIG. 3 is an integrated processor supplied with signals representing engine throttle position, engine speed, engine coolant temperature, torque converter speed, vehicle speed, a selected range of a gear selector, throttle valve pressure, the state of the selected transmission operating modes 52, the state of a brake switch 54, and signals representing the state of other operating parameters. Information conveyed by these input signals is conditioned by input conditioning circuitry 56 and transmitted on data bus 58 to a central processing unit 60 accessible to electronic memory 62. The electronic memory contains control transmission algorithms for controlling gear shift scheduling, electronic pressure control EPC, and engagement and disengagement of the torque converter bypass clutch 82. The processing unit recalls information and control algorithms from electronic memory 62, executes the algorithms, and produces output signals carried on data bus 64 to output driver circuits 66, which produce electronic signals from the signals produced by the microprocessor. The output signals drive electrical solenoid-operated valves 70, 72, 74, 76, 78 located in an hydraulic valve body 68 adapted to respond to the output signals.

The results of logical and arithmetic computations executed by the processor are stored in RAM, which is addressed, erased, rewritten, or changed in accordance with logic of the control algorithms. Certain values are stored in keep alive memory KAM, whose contents are maintained despite opening the engine ignition switch, provided the battery remains connected to the power supply.

The algorithms that control operation of the transmission are divided into several control modules executed sequentially in a known fashion during a background pass. The algorithms of each module are executed sequentially just as the modules themselves are executed sequentially. Information that results from the sensor input data and information stored in memory and learned from previous executions of the algorithms is used during execution of the control algorithms to produce electronic signals present at the output ports of the microprocessor.

Figure 2:
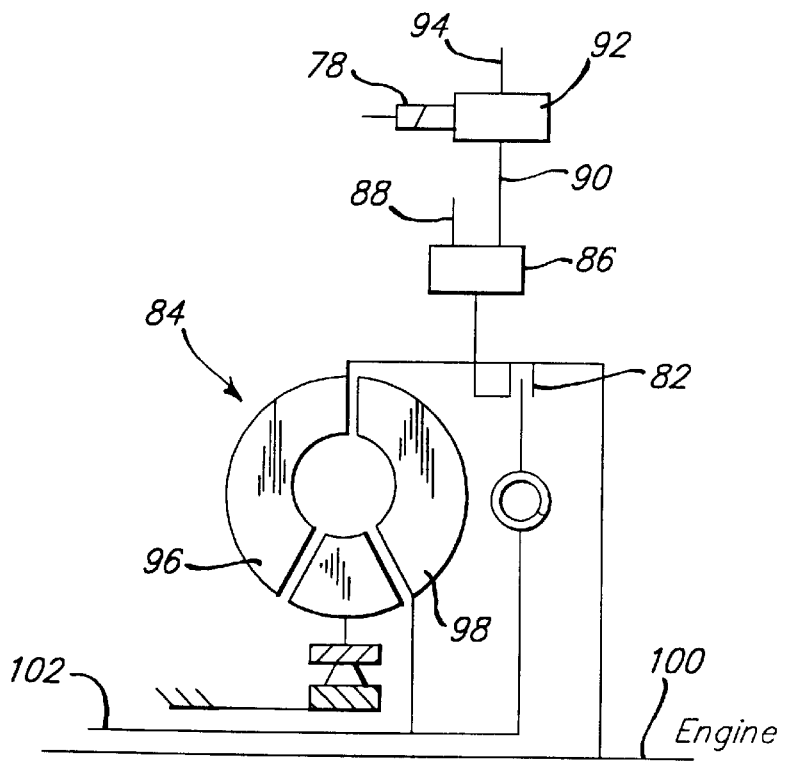
FIG. 2 shows a torque converter, a bypass or lockup clutch, and a portion of a hydraulic system for controlling the clutch.

Referring now to FIG. 2, the lock-up clutch 82 of a torque converter 84 is alternately hard-locked or soft-locked (modulated) by directing hydraulic fluid through converter bypass-clutch control valve 86, which is supplied with regulated line pressure in line 88. A variable pressure valve 92 is supplied with constant pressure through line 94 from a solenoid-pressure regulator valve and is controlled by a pulse-width modulated (PWM) signal applied to solenoid 78 from the microprocessor output. Valve 86 produces a pressure difference across bypass clutch 82. When clutch 82 is hard-locked, a direct mechanical connection between impeller 96 and turbine 98 is produced. The impeller of torque converter 84 is driven from the crankshaft 100 of an engine, and turbine 98 drives a transmission input shaft 102. When clutch 82 is disengaged, the turbine is driven hydrodynamically by the impeller.

Figure 4A:
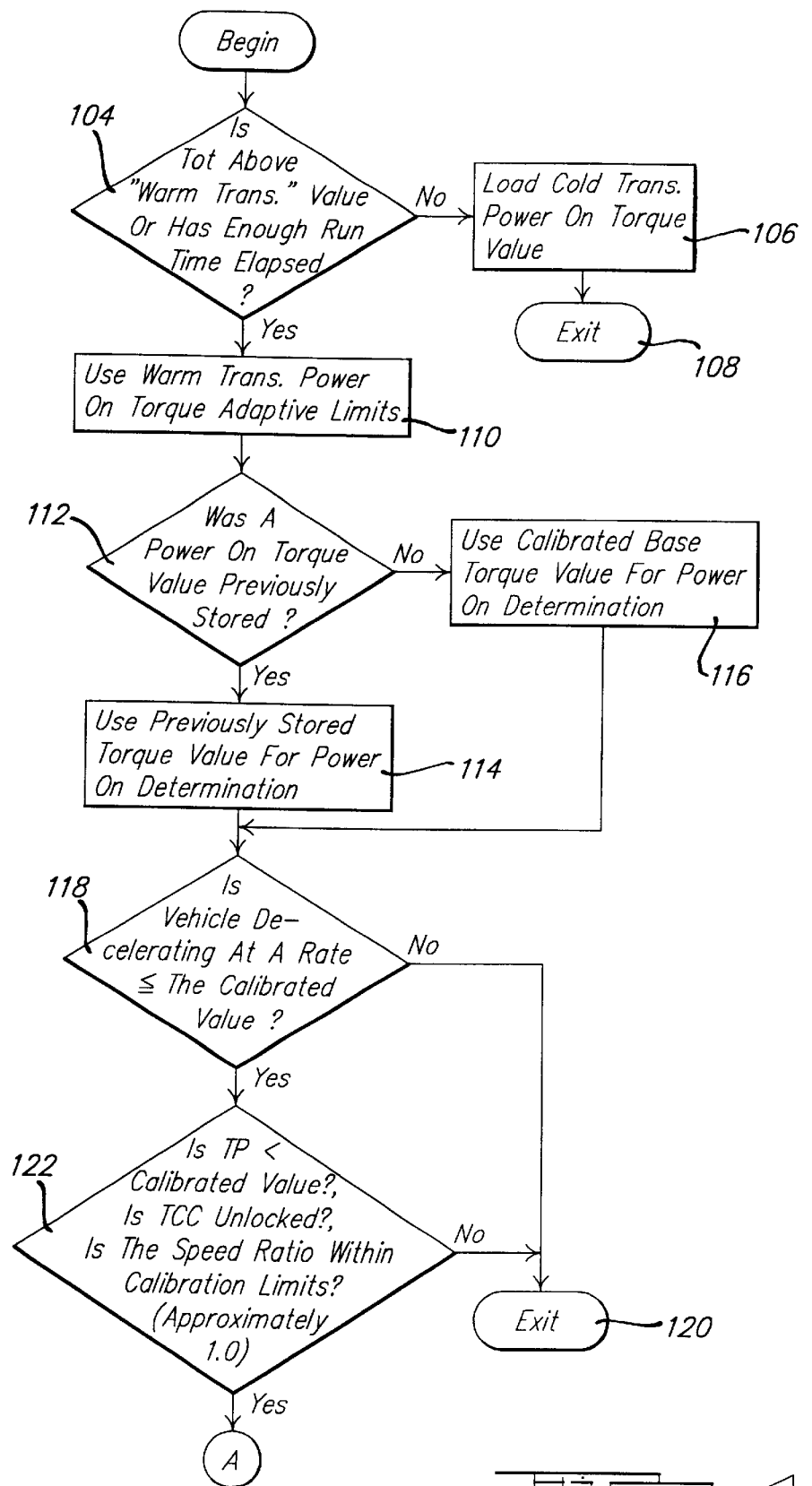
FIGS. 4A and 4B comprise a logic flow diagram showing the adaptive torque based power-on method according to the present invention.
Figure 4B:
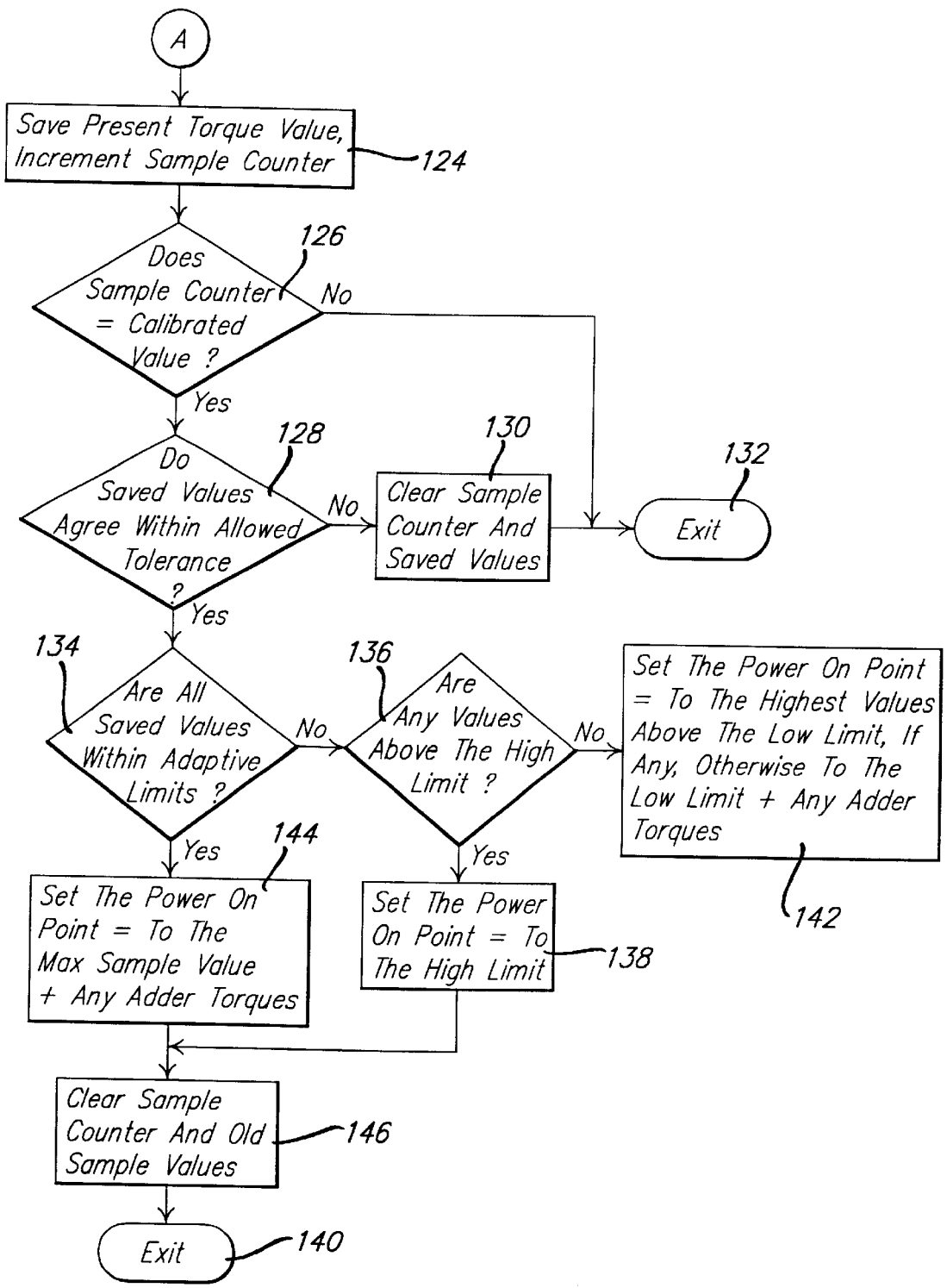

The method of the present invention for determining the engine torque corresponding to the onset of positive torque at the transmission input, i.e., the threshold of the power-on condition, is described next with reference to FIG. 4. At 104, the transmission oil temperature is compared to a predetermined reference temperature to determine whether the transmission is at a sufficiently high temperature. Alternatively the elapsed run time can be compared to the length of a predetermined reference period for the same purpose. If the transmission temperature is below approximately 20° F., control passes to 106 where a calibrated scalar torque value is used as the power-on value, and the adaptive torque base routine is exited at 108.

If the transmission temperature is sufficiently high, upper and lower limits for engine torque corresponding to the power-on threshold are set at 110, the range being approximately between 10–60 ft-lb.

Keep alive memory KAM is used to store pertinent values determined by the control algorithm so that the values are obtained and not lost when the ignition switch is turned to the off position. An inquiry is made at 112 to determine whether KAM contains a power-on torque magnitude from a previous execution of the control algorithm. If so, at 114 that value is recalled from KAM and is used for the power-on determination. If, however, the power-on torque magnitude is absent, either because the battery was disconnected from the electrical power supply since the last execution of the algorithm or because there has been no prior execution of the control algorithm, at 116 a calibrated based torque magnitude for the power-on condition is determined and used during the current execution of the control algorithm.

In order to prevent potential inaccuracy in the power-on torque magnitude determined by this algorithm, at 118 the vehicle's deceleration rate is compared to a calibrated or predetermined reference deceleration. If the vehicle decelerates at a rate that exceeds the calibrated value, control passes to 120 where the control algorithm is exited. If the test at statement 118 is positive, control passes to 122.

The state of the torque converter bypass clutch must be open or unlocked, and the speed ratio across the torque converter must be within predetermined limits, preferably between 0.97 and 1.02. It has been determined that the powertrain torque does not change rapidly when this speed ratio is within the specified limits. However, when the speed ratio is below 0.97, the transmission loads the engine and the torque carried by the engine output shaft 13 can change rapidly. Therefore if the tests at statement 122 are passed there is a high level of confidence that the torque produced by the engine is not changing rapidly and that the power-on condition can be sensed with a high level of precision. If the test at statement 122 is failed, control again passes to 120 where execution of this algorithm is terminated.

If the tests of statement 122 are passed, the present engine torque magnitude, as determined by mapping its value with reference to engine and vehicle parameters, or using a torque sensor on the engine shaft, is saved in KAM and a sample counter is incremented at 124.

If the number of saved torque magnitudes, the count stored in a sample counter, equals or exceed a predetermined reference count, statement 126 directs control to statement 128 where it is determined whether all of the saved torque magnitudes are within a predetermined range of each other, preferably about 5.0 ft-lb. If the saved values are not within that tolerance range, the sample counter and saved values are cleared from memory at 130 and control exits the algorithm at 132. If the test result at 128 is negative, at 130 the counter is zeroed and the saved torque values are deleted from memory.

If the saved torque values are within the tolerance range, at 134 the saved torque magnitudes are compared to an acceptable range of torque magnitudes, preferably 10–50 ft-lb. If any saved torque magnitude is outside those limits, control passes to statement 136 where it is determined whether any saved torque magnitude is above the upper limit. If so, the power-on torque magnitude is set equal to the high limit at 138, control passes to statement 140. If no saved torque magnitude fails the high limit test at 136, at 142 the power-on torque magnitude is set equal to the highest magnitude above the low limit, if any. Otherwise the power-on torque magnitude is set equal to low limit plus adder torque that accounts for accessory drive and electric power loads currently applied to the engine. Then control passes to statement 140.

The adder torque values are calibrated torque magnitudes used to provide a margin of safety and to compensate for loads associated with the air conditioning compressor and other accessory power requirements. The magnitude of these adder torque loads is determined by mapping operating parameters of the accessories and vehicle operating conditions. Separate adaptive values could be learned based on current accessory loads.

If the inquiry at statement 134 is positive, the power-on torque magnitude is set, at statement 144, equal to the maximum of the saved torque magnitudes increased by the adder torque values.

Statement 140 clears the sample counter and the saved torque magnitudes. Execution of the control algorithm ends at statement 146.

In this way, the onset of the power-on condition discounts the torque values present when the transmission operating temperature is too low, when the vehicle is decelerating too quickly, the torque converter is locked or partially locked, and the speed ratio is outside of a range of tolerance close to unity.

The method of this invention relies on the speed ratio across an open torque converter being at or very near 1.0. Therefore the power flow through the powertrain is at or near zero. The optimum time for those sampling conditions to occur in the vehicle is at very low driver demand decelerations with the torque converter unlocked, especially in the upper gear ranges. As long as the speed ratio is approximately 1.0, a reliable power-on torque magnitude can be learned.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A method for determining with the aid of an electronic computer system the power-on torque magnitude in a powertrain of a motor vehicle having an engine, and an automatic transmission having a torque converter that includes a bypass clutch for mechanically connecting and disconnecting the impeller and turbine of the torque converter, the impeller connected to the engine, the turbine connected to a transmission input shaft, comprising the steps of:

repetitively determining that the torque converter clutch is disengaged;

repetitively determining that the speed ratio across the torque converter is within a predetermined speed range;

repetitively determining that the rate of vehicle deceleration is lower than a predetermined deceleration rate;

repetitively determining the magnitude of torque produced by the engine;

repetitively storing successive engine torque magnitudes in retrievable electronic memory;

deleting from memory the stored torque magnitudes, if any of the stored torque magnitudes is greater than a predetermined magnitude from the other stored torque magnitudes;

setting the power-on torque magnitude equal to the maximum stored torque magnitude, if all stored torque magnitudes are within a predetermined range of torque magnitudes; and adding to the maximum stored torque magnitude the corresponding magnitude of engine torque currently driving accessory equipment; and using the sum of the torque magnitudes as the power-on torque magnitude.

2. The method of claim 1, further comprising repetitively determining that the transmission oil temperature is greater than a predetermined minimum temperature.

3. The method of claim 1, further comprising repetitively determining that the position of the engine throttle is less than a predetermined throttle position.

4. The method of claim 1, further comprising:

if any of the stored torque magnitudes is greater than the predetermined range of torque magnitudes, setting the power-on torque magnitude equal to an largest torque magnitude of the predetermined range of torque magnitudes; and using the power-on the torque magnitude during a test of the powertrain.

5. The method of claim 4, further comprising:

if any of the stored torque magnitudes is less than predetermined range of torque magnitudes, setting the power-on torque magnitude equal to the largest of the stored torque magnitudes; and adding to the maximum stored torque magnitude the corresponding magnitude of engine torque currently driving accessory equipment;

deleting the stored torque magnitudes from memory; and using the sum of the torque magnitudes as the power-on torque magnitude.

6. A method for determining the power-on torque magnitude in a powertrain of a motor vehicle having an engine, and an automatic transmission having a torque converter that includes a bypass clutch for mechanically connecting and disconnecting the impeller and turbine of the torque converter, the impeller connected to the engine, the turbine connected to a transmission input shaft, comprising the steps of:

recording data corresponding to periods when the torque converter clutch is disengaged;

recording data corresponding to periods when the speed ratio across the torque converter is substantially at unity;

recording data corresponding to periods when the rate of vehicle deceleration is lower than a predetermined deceleration rate;

determining the magnitude of torque produced by the engine;

recording successive engine torque magnitudes; disregarding the recorded torque magnitudes, if any of the recorded torque magnitudes is greater than a predetermined magnitude from the recorded torque magnitudes;

setting the power-on torque magnitude equal to the maximum stored torque magnitude, if all recorded torque magnitudes are within a predetermined range of torque magnitudes; and adding to the maximum recorded torque magnitude the corresponding magnitude of engine torque currently driving accessory equipment; and using the sum of the torque magnitudes as the power-on torque magnitude.

7. The method of claim 6, further comprising repetitively determining that the transmission oil temperature is greater than a predetermined minimum temperature.

8. The method of claim 6, further comprising recording data corresponding to periods when the position of the engine throttle is less than a predetermined throttle position.

9. The method of claim 6, further comprising:

if any of the recorded torque magnitudes is greater than the predetermined range of torque magnitudes, setting the power-on torque magnitude equal to the largest torque magnitude of the predetermined range of torque magnitudes.

10. The method of claim 9, further comprising:

if any of the recorded torque magnitudes is less than a predetermined range of torque magnitudes, setting the power-on torque magnitude equal to the largest of the stored torque magnitudes; and adding to the maximum recorded torque magnitude the corresponding magnitude of engine torque currently driving accessory equipment;

using the sum of the torque magnitudes as the power-on torque magnitude.

11. A method for determining with the aid of an electronic computer system the power-on torque magnitude in a powertrain of a motor vehicle having an engine, and an automatic transmission having a torque converter that includes a bypass clutch for mechanically connecting and disconnecting the impeller and turbine of the torque converter, the impeller connected to the engine, the turbine connected to a transmission input shaft, comprising the steps of:

repetitively determining that the torque converter clutch is disengaged;

repetitively determining that the speed ratio across the torque converter is within a predetermined speed range;

repetitively determining that the rate of vehicle deceleration is lower than a predetermined deceleration rate;

repetitively determining the magnitude of torque produced by the engine;

repetitively storing successive engine torque magnitudes in retrievable electronic memory;

deleting from memory the stored torque magnitudes, if any of the stored torque magnitudes is greater than a predetermined magnitude from the other stored torque magnitudes;

if all stored torque magnitudes are within a predetermined range of torque magnitudes, setting the power-on torque magnitude equal to the maximum stored torque magnitude, adding to the maximum stored torque magnitude the corresponding magnitude of engine torque currently driving accessory equipment, and using the sum of the torque magnitudes as the power-on torque magnitude;

if any of the stored torque magnitudes is greater than the predetermined range of torque magnitudes, setting the power-on torque magnitude equal to an largest torque magnitude of the predetermined range of torque magnitudes;

if any of the stored torque magnitudes is less than a predetermined range of torque magnitudes, setting the power-on torque magnitude equal to the largest of the stored torque magnitudes, adding to the maximum stored torque magnitude the corresponding magnitude of engine torque currently driving accessory equipment, and using the sum of the torque magnitudes as the power-on torque magnitude.

12. The method of claim 11, further comprising repetitively determining that the transmission oil temperature is greater than a predetermined minimum temperature.

13. The method of claim 11, further comprising repetitively determining that the position of the engine throttle is less than a predetermined throttle position.

* * * * *